United States Patent [19]

Hoppe

[11] Patent Number: 5,068,894
[45] Date of Patent: Nov. 26, 1991

[54] METHOD OF GENERATING A UNIQUE NUMBER FOR A SMART CARD AND ITS USE FOR THE COOPERATION OF THE CARD WITH A HOST SYSTEM

[75] Inventor: Joseph Hoppe, Les Molieres, France

[73] Assignee: U.S. Philips Corp., New York, N.Y.

[21] Appl. No.: 571,051

[22] Filed: Aug. 22, 1990

[30] Foreign Application Priority Data

Aug. 22, 1989 [FR] France .................. 89-11113

[51] Int. Cl.$^5$ .......................... H04L 9/32; G07F 7/08; H03B 29/00; G06F 1/02
[52] U.S. Cl. ......................................... 380/23; 380/24; 380/25; 380/29; 380/46; 331/78; 364/717; 340/825.31; 340/825.34; 235/379; 235/380; 235/382
[58] Field of Search .................. 380/22-25, 380/28, 29, 46, 21, 43; 235/379, 380, 382; 364/717, 200, 900; 331/78; 902/26; 340/825.31, 825.34

[56] References Cited

U.S. PATENT DOCUMENTS 4,295,039 10/1981 Stuckert .................. 235/380
4,804,825 2/1989 Bitoh .................. 235/380
4,849,927 7/1989 Vos .................. 364/900

OTHER PUBLICATIONS

FIPS Pub 46-1 "Data Encryption Standard", U.S. Department of Commerce/National Bureau of Standards, reaffirmed Jan. 12, 1988.

Primary Examiner—Bernarr E. Gregory
Attorney, Agent, or Firm—Jack D. Slobod

[57] ABSTRACT

A smart card (1) which includes a random access memory RAM (10) and a read-only memory PROM (7) incorporating a production key (PK), a distributor key (MK), a bearer code (CP) and a serial number (NS) generates a unique number (NU) which is stored in the memory RAM (10) in the card after execution of the following steps of a program which is specific of the card:

a - modulo-2 addition and storage in the RAM (10) of the result:

$$PK \oplus MK = KMP,$$

b - the encryption of a unique input message ME, generated by the card, by means of a reversible algorithm (ALG, ALB$^{-1}$) using the key KMP:

$$NU = ALG_{KMP}(ME).$$

14 Claims, 3 Drawing Sheets

METHOD OF GENERATING A UNIQUE NUMBER FOR A SMART CARD AND ITS USE FOR THE COOPERATION OF THE CARD WITH A HOST SYSTEM

A. FIELD OF THE INVENTION

The invention relates to a method of generating a pseudo-random unique number (NU), each number NU being intended to individualise, for a specific use of a smart card, the cooperation with a host system via said card, said card comprising at least the following memories: a random access memory RAM, a program memory ROM, and a data memory of the EPROM or E2-PROM type, incorporating a production key (PK), a distributor key (MK), a bearer code (CP), and a serial number (NS).

The invention also relates to the use of the method of generating a unique number for notably the authentication of a host system which cooperates, via a reader, with a smart card, or for the rehabilitation, by way of a competent host system, of a smart card which has been blocked subsequent to several (for example, three) consecutive false presentations of the bearer code.

The invention also relates to a generator for generating a pseudo-random unique number of the type indicated, to a smart card housing such generator, and to a verification system comprising an interconnected device string comprising a host, a terminal, and a card of the type indicated supra. Such method, devices and system are of advantageous usage in the exchange of data, financial debits and credits, and other sensitive fiduciary objects between host systems and persons by means of automated terminals.

B. DESCRIPTION OF THE RELATED ART

A random or pseudo-random number is generally used for cryptographic protocols in order to prevent the repeated use (the rearrangement) of encrypted data (notably by a non-authorized person), or quite simply as an authentication element. Generally speaking, the execution of an algorithm for generating a pseudo-random number is complex, imposing the technical problem of conceiving such an algorithm which must be executed in a microprocessor component having limited random access (RAM) and read only memory (ROM) capacities as is the case for a smart card. The generating of such a random number takes place in known manner in an electronic device which cooperates with a smart card as described in European Patent 0 096 599 (which corresponds to U.S. Pat. No. 4,544,833), where a random number generator is provided in a transaction apparatus in order to authenticate or certify information contained in a memory of an electronic support. For smart card applications requiring a high degree of security and confidentiality, it is desirable that the smart card itself generates said (pseudo) random numbers (unique numbers), which places the latter on equal footing with electronic devices cooperating therewith (proximity reader, remote host system), enabling it to perform cryptographic calculations in an internal, inaccessible manner, followed by comparisons of the cryptograms so calculated for possible validation of such specific use.

Each unique number transmitted by the smart card should preferably have the following characteristic properties:

- the number generated may not be predictable, regardless of any previously generated number and regardless of the type of card used,
- the number generated must be different upon each activation,
- the number generated must be independent of the instant of request,
- the number generated must be usable only once (unique number).

It is an object of the invention to generate a pseudo-random number in a smart card by way of a specific program of the card.

It is an other object of the invention to generate a pseudo random number in a smart card by reversible encryption of a unique input message generated by the card.

It is an other object of the invention to generate a pseudo random number in a smart card by reversible encryption of a unique input message generated by the card by way of a presentation key resulting from a logic operation between two presentation keys previously introduced into the card.

C. SUMMARY OF THE INVENTION

These objects are achieved in that the method set forth in the preamble is characterized in that said number NU is generated and stored in the memory RAM in said card after successive execution of the following steps of a program which is specific of the card:

a-a logic operation, notably modulo-2 addition, of the keys PK and MK and the storage of the result KMP of the addition in the memory RAM:

$$PK \oplus MK = KMP$$

b-the encryption in said unique number NU of a unique input message ME which is generated by, the card and which is modified upon each specific use by means of a reversible algorithm (ALG, ALG$^{-1}$) by way of the key KMP:

$$NU = ALG_{KMP}(ME).$$

Preferably, the reversible encryption algorithm used is the secret key encryption system known as: "Data Encryption Standard" (indicated as DES for its encryption function and DES$^{-1}$ for its decryption function) described in the publication "Federal Information Processing Standards Publication" (FIPS PUB46) of Jan. 15, 1977, of the National Bureau of Standards of the U.S. Department of Commerce (which was last reaffirmed Jan. 22, 1988 as FIBS PUB 46-1). This algorithm is of course present in the smart card in order to realize the cryptographic functions and to protect the data (in this respect see French Patent FR 2 611 962 in the name of Applicant).

The fact that the pseudo random number thus obtained is unique and the characteristic properties as described above result partly from properties required of the input message ME and the key KMP. In a preferred version in accordance with the invention, in as far as the generating of the input message is concerned, the method of generating the unique number is characterized in that said card also comprises a counter RAM which contains the number CTRAM and a counter PROM which contains the number CTROM, said input message ME being formed by the juxtaposition of three numbers: NS, CTRAM, CTROM, said counter RAM being initialized to 00 . . . 0 upon each activation of the card and being incremented upon each generation of the unique number NU, the counter PROM being incremented upon a specific use after each activation or reset to zero of the card (RESET) if the bearer code CP has not been presented or if the counter RAM overflows.

In a preferred version of the invention, in as far as the generating of the key KMP is concerned, the method is characterized in that the key PK is known only to the manufacturer of the card and that the key MK is known only to the distributor of the card and that, consequently, the key KMP which is present in the memory RAM and which is, inaccessible from the outside, cannot be known to any of the two parties, which is in conformity with the first property of the generation of the unique number.

The incrementation of the counters RAM and PROM thus realized is such that it is not possible to obtain the same input message twice during the service life of the smart card. Moreover, this input message is unique for each card, given the fact that its serial number is unique.

A preferred application of the method of generating a unique number in accordance with the invention relates to the authentication of a host system which cooperates, via a reader, with a smart card, utilizing a DES mode of operation which is the M.A.C. as described notably in the document ANSI X9.9, published in 1982 by the American Bankers Association; this application is characterized by the following steps:

a-the host system dispatches an instruction for generating the unique number NU to the smart card,
b-the card generates a unique number NU, stores it in its memory RAM, and applies it to the host system,
c-the card and the host system calculate, using said encryption (ciphering) algorithm and the same master key KAC of the card, an authentication value VAE for the host system and VAC for the card, respectively:

$$VAE = ALG_{KAC}(NU)$$

$$VAC = ALG_{KAC}(NU)$$

d-the host system applies the authentication value VAE to the card,
e-the card compares the authentication values VAE and VAC and validates, for the further operations, its cooperation with the host system only if the following identify is verified within the card:

$$VAE = VAC.$$

In the context of the cooperation between the card and the host system the authentication of the host system by the card can prove that one possesses the correct key without the risk of divulging this key, which is due to the fact that the card itself performs the cryptographic calculation VAC rather than the reader, which would in the latter case imply the extraction in the open of the key KAC from the card to the reader, and hence a risk of divulging.

Another preferred application of the method of generating a unique number in accordance with the invention relates to the rehabilitation of the smart card after several, notably three, consecutive false presentations of said bearer code CP, the card being connected to a remote host system by means of a reader, said host system comprising a master key KEC of the card which is necessary for said rehabilitation; this application is characterized by the following steps:

a-the reader instructs the smart card to generate the unique number NU,
b-the reader stores the unique number NU from the card and also the error parameters (triple consecutive PE) and seizes the bearer code CP introduced by the bearer of the card,
c-the reader calculates a rehabilitation message MR by modulo-2 addition:

$$MR = (CP, PE, PE) \oplus NU$$

d-the reader dispatches the rehabilitation message MR to the host system, accompanied by an instruction requesting authentication of the message MR,
e-the host system encrypts the message MR by way of the key KEC:

$$RES = ALG_{KEC}(MR)$$

and despatches the cryptogram RES to the reader,
f-the reader applies the cryptogram RES to the card,
g-the card executes, by way of the key KEC, the inverse encryption of the cryptogram RES:

$$ALG^{-1}{}_{KEC}(RES) = MR'$$

h-the card performs the modulo-2 addition:

$$MR' \oplus NU = CP', PE', PE''$$

$$MR' \oplus NU = CP', PE', PE''$$

i-the card cancels the error parameter PE only if the following identities are verified within the card:

$$CP' = CP$$

$$PE' = PE'' = PE.$$

The card is thus reactivated after having been blocked subsequent to a predetermined number of consecutive false presentations of the bearer code CP, also referred to as user code, confidential code or Personal Identification Number (PIN). This rehabilitation of the card is again performed with perfect confidentiality, considering that the bearer code CP is not transmitted on-line between the reader and the host system, and that the master key KEC is not communicated to the reader.

D. BRIEF DESCRIPTION OF THE DRAWINGS

The following description, given by way of example with reference to the accompanying drawings, will offer a better understanding as to how the invention can be carried out.

E. DESCRIPTION OF PREFERRED EMBODIMENTS

Figure 1:
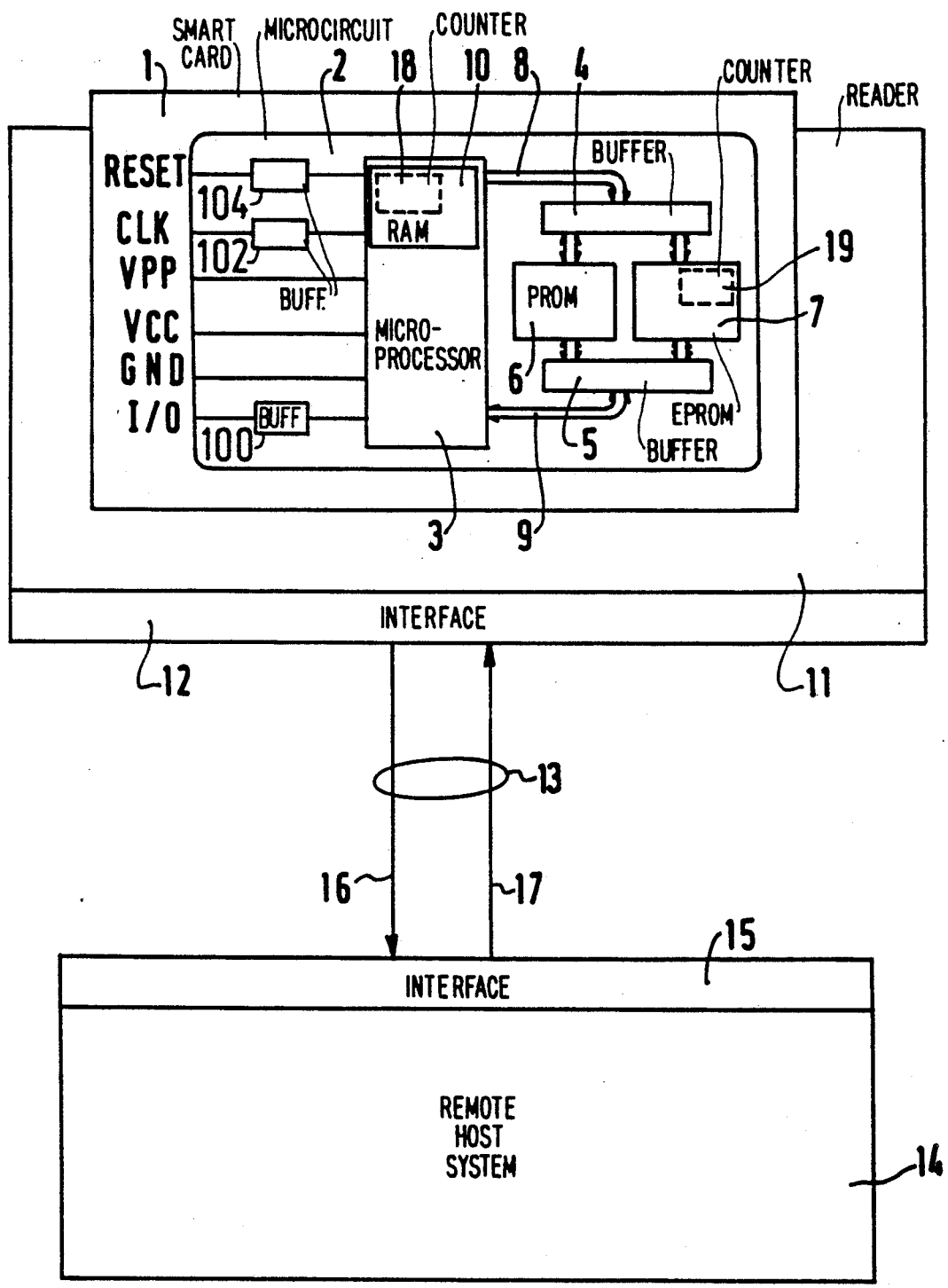
FIG. 1 shows a smart card introduced into a reader, the assembly being linked to a host system, in accordance with the invention.

FIG. 1 shows a removable and portable electronic carrier 1 which is referred to hereinafter as a smart card or simply card. The microcircuit 2 of the card has an architecture which is essentially known. This architecture consists of an 8-bit microprocessor 3 which can incorporate a memory RAM 10, two buffer-type RAM memories 4 and 5, a program memory ROM 6, and a data memory 7 of the type EPROM or E2PROM. The memory RAM 4 is connected to the microprocessor 3 by way of a bidirectional address bus 8 and the memory RAM 5 is connected to the microprocessor by way of a bidirectional data bus 9. Moreover, each RAM 4, 5 is connected to the memories 6, 7, each time by way of a bidirectional bus as shown. From a technological point of view the memory 7 is an EPROM but, after the inscription of given data such as notably keys as indicated hereinafter, it is controlled as if it is neither erasable nor rewritable, i.e. it operates as a ROM.

The card 1 is symbolically shown as being inserted into a reader 11. The card comprises six contacts which, in this position, cooperate with 6 homologous contacts of the reader which, from the bottom upwards are as follows: the serial input/output contact I/O, the ground contact GND, the power supply voltage for the microcircuit VCC (5 V) the programming supply voltage VPP, the clock CLK, and the resetting to zero RESET. Some of these six contacts are connected to the microcircuit via ports (not indicated). Furthermore, the interconnections for logic signals I/O, CLK, RESET have been provided with unidirectional or bidirectional buffer stages 100, 102, 104, as the case may be. Via an inferface 12 and a communication link, for example a transmission line 13, the reader communicates with a remote host system 14 which also comprises an interface 15. The transmission line 13 is symbolically represented by two wires, i.e. wire 16 which transmits the information from the reader 11 to the host system 14, and wire 17 which transmits the information in the opposite direction.

The memory 7 stores presentation keys or master keys and calculation keys. Among the presentation keys there is a production key PK which is introduced by the manufacturer during the pre-personalization phase and which is only known to the manufacturer, and a distributor key MK which is introduced during the personalization phase by the distributor distributing the card, for example a bank, this number being known only to the distributor. The key PK protects the card against non-authorized personalization; it is generated on the basis of a batch card from the manufacturer. Another presentation key is formed by the bearer code CP which relates to the holder person of the card. This bearer code must remain confidential.

The memory 7 also comprises a serial number NS which has the property that it can be read on the card, and hence is non-confidential, and that it is specific of each card, as introduced by the manufacturer.

The invention proposes to generate, in a simple manner and by means of a specific program contained in the program memory 6, a pseudo-random number which is a unique number. To this end, three means are applied: the first means consists of the combination, in the memory RAM 10 of the card, of the two keys PK and MK by performing a logic operation therebetween, preferably the bit-wise exclusive OR addition (modulo-2 addition):

$PK \oplus MK = KMP$ Preferably, but not by way of restriction,

PK, MK and KMP comprise the same number of bits, for example 64.

Thus, the key KMP is obtained which cannot be extracted from the microcircuit 2 nor be modified from the outside, so that it is not known to anyone. In fact, the manufacturer and the distributor do not exchange their respective partial knowledge elements, PK, MK, respectively.

The second means combines the key KMP with a message (number) ME which is generated by the card and which is referred to as the input message which has the principal property that it is unique and that it is modified upon each specific use; it can neither be extracted from the microcircuit 2 nor be modified from the outside. This combination consists in the encryption of the message ME through a reversible algorithm ALG, $ALG^{-1}$, by way of the key KMP:

$$ALG_{KMP}(ME) = NU$$

NU: unique number (pseudo random).

Preferably, the reversible encryption algorithm used is the well-known secret key encryption system called: Data Encryption Standard (DES, $DES^{-1}$) which has already been cited, or Data Encryption Algorithm (DEA, $DEA^{-1}$).

The third means used for generating the unique number NU consists in the particular way the input message ME is formed. This message ME must have the following properties: it must be different upon each activation of the card, it must be independent from the instant of its request, and it must itself be a unique number, i.e. it must be usable only once and never be repeated. Among the various possible solutions for generating the number ME according to these criteria, the following solution is chosen; provision of a counter 18 denoted by broken lines in the memory RAM 10, for example incorporated in the microprocessor 3, and whose content is denoted as CTRAM, and a counter 19 which is denoted by broken lines in the memory PROM 7 and whose content is denoted as CTROM; the input message ME is formed by concatenating the following quantities proceeding from most-significant to least-significant; the serial number NS of the card, being a unique number which enables differentiation between a card and any other card and which is introduced during the pre-personalization phase (by the manufacturer).

CTRAM, incremented upon each new generation of the unique number NU, the counter 18 being initialised to 00 . . . 0 upon each activation of the card or upon each resetting to zero (RESET).

CTROM, incremented after each power up or resetting to zero (RESET). Such reset occurs if the confidential bearer code CP has not been presented by the holder person or if the counter RAM overflows. The input message ME is thus presented as: NS, CTRAM, CTROM.

The incrementation (by one or more units) of the counter 18 upon each generation of the unique number NU ensures that the input message ME differs from one instance of use of the card to the next, provided that at least the latter had entailed a power-up situation. The object being to ensure that identical sequences of consecutive values of the number ME cannot occur is realized in that CTRAM periodically assumes the value zero, and the incrementation (by one or more units) of the counter 19, notably upon power up.

Moreover, specific incrementation modes of the counter PROM 19 are provided for counteracting any fraudulent actions undertaken by a non-authorized holder of the card. First, it concerns the incrementation of the counter PROM 19 after an incorrect presentation of the bearer code CP. Second, if a fraudulent person attempts to exhaust the counting capability of the counter RAM 18 by systematically making the card generate successive numbers NU without disconnection or resetting to zero of the microcircuit, the counter RAM 18 may return to zero after overflow, after several tens of thousands of attempts. Then a sequence of the number ME other than that corresponding to the first attempts appears due to the incrementation of the counter PROM 19 upon overflow of the counter RAM 18. Thus, it is impossible for any one to predict and hence generate, outside the microcircuit, a number NU which is identical to a number NU already generated by the card during a specific use of the latter, thus precluding any possibility of fraud, including such operations which are necessarily linked to the supply of the unique number NU by the card itself and to its ultimate use in combination with encryption and verification operations of a mathematical identity.

Two major applications of the method of generating a unique number as disclosed above will now be described with reference to the FIGS. 2 and 3 in which the interrupted arrows indicate optional steps in the cooperation between the card CD and the host system HS via the card reader RD.

Figure 2:
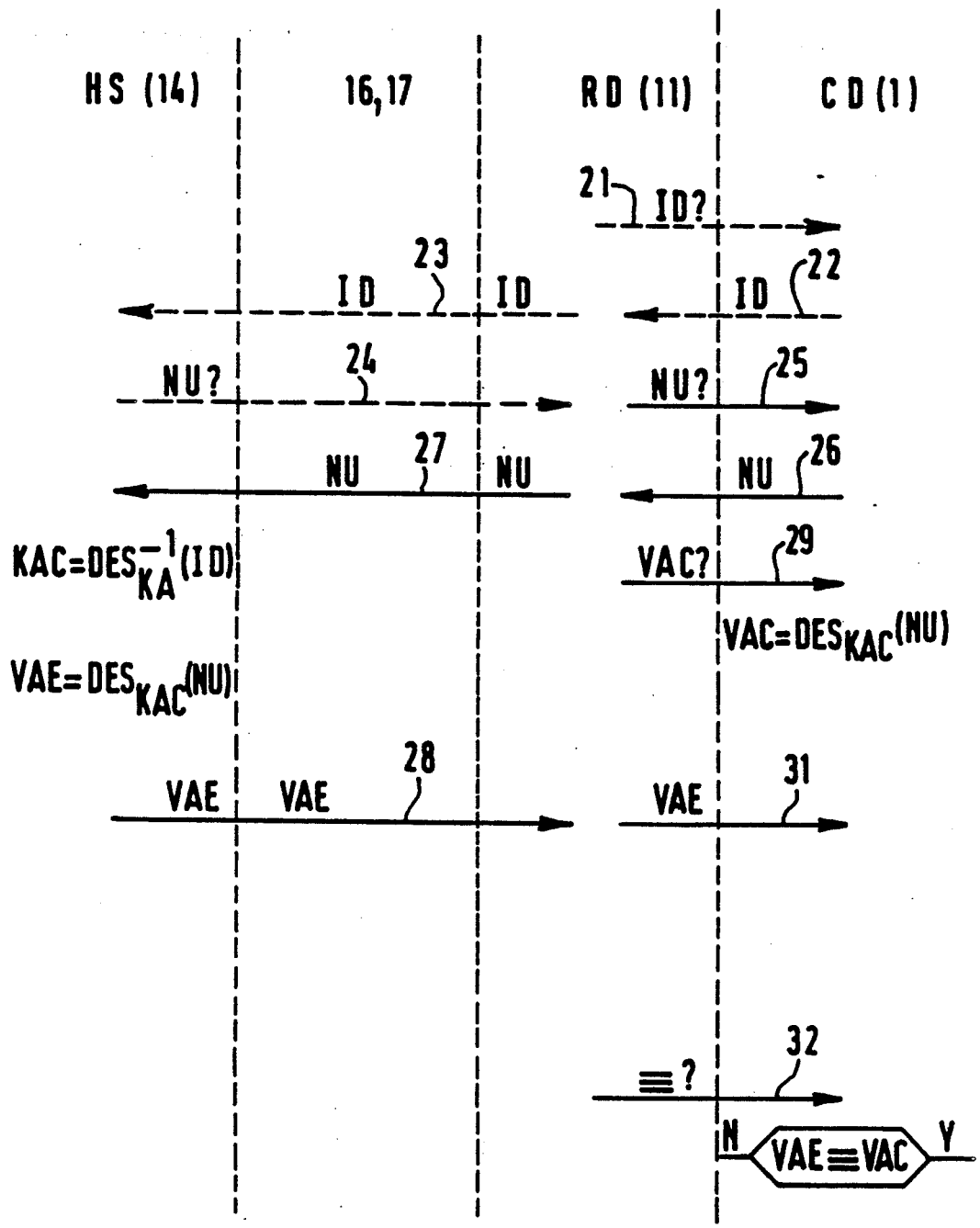
FIG. 2 shows the diagram of an authentication process between a card and a host system in accordance with the invention.

The identification process of FIG. 2 is based on the following situation: a reader in which a card has been introduced verifies, on the basis of the latter, that the remote host system is indeed that with which the card is allowed to interact. In the Figure the column between vertical broken lines, denoted by the references 16 and 17, symbolizes the transmission line 13 of FIG. 1. Furthermore, column 14 symbolizes the host, column 11 the reader, and column 1 the card.

In a manner which is generally known for the type of application involved here, the host system is assumed to know or recognize a master presentation key of the card, referred to as KAC (or KEC) by means of which encryption operations are performed both in the card and in the host system (the host system, however, may itself comprise a card for performing said encryption operations). Preferably, a prior encryption of the key KAC is performed, always in known manner, into a cryptogram ID which is referred to as the identification code, in order to avoid the on-line transmission of the key KAC in the open. This optional step is preferably used at the start of the processes of the FIGS. 2 and 3.

For the authentication (FIG. 2) the reader transmits (at 21) a read command for reading the identification code ID by the card. The code ID is transmitted (at 22) from the card to the reader and (at 23) from the reader to the host system. The arrow 24 indicates an optional instruction for requesting the unique (pseudo random) number NU as generated by the host system and the arrow 25 indicates the same instruction either relayed by the reader (in case of generation by the host) or in the other case initiated by the reader itself. As indicated earlier, thereupon, the card generates a number NU, which number is stored in the memory RAM 10. At 26 the number NU is transmitted to the reader and subsequently, at 27, from the reader to the host system. First of all, the host system calculates, by inverse encryption of ID, the master presentation key KAC of the card (unless in accordance with an alternative, it had received it in advance from the card and had recognised it by comparison with an internal table of the host system): $KAC = DES_{KA}^{-1}(ID)$.

The key KA is an application key used notably in a so-called M.A.C. environment described in the document ANSI X9.9, published by the American Bankers Association. This environment implies the use of the DES algorithm several times in succession in case of a message comprising more than 64 bits. The host system subsequently calculates an authentication value in the form of the cryptogram VAE:

$$VAE = DES_{KAC}(NU).$$

AT 28, VAE is transmitted to the reader and stored therein for a later operation. At 29, the reader supplies the card with a request instruction for calculating the authentication value VAC. The card then performs an encryption operation which is analogous to that performed for VAE in the host system:

$$VAC = DES_{KAC}(NU).$$

It is to be noted that in this mode of operation the calculated authentification value VAC cannot be extracted from the card.

At 32, the reader supplies an instruction to the card for comparing VAC to the quantity VAE which the reader had previously transmitted to the card (step 31) after storage in the reader in step 28. Now, the card performs a comparison:

$$VAE = VAC.$$

In the case of identity (Y), the card validates the subsequent operations, not shown, for the relevant user application between the card and the host system. In the case of non-identity (N), the card signals its disapproval for any remainder of such operations. In this authentication operation between a smart card and a host system, the pseudo random number NU generated by the card serves mainly to avoid the re-use or the re-play of the same authentication value VAE or VAC.

Figure 3:
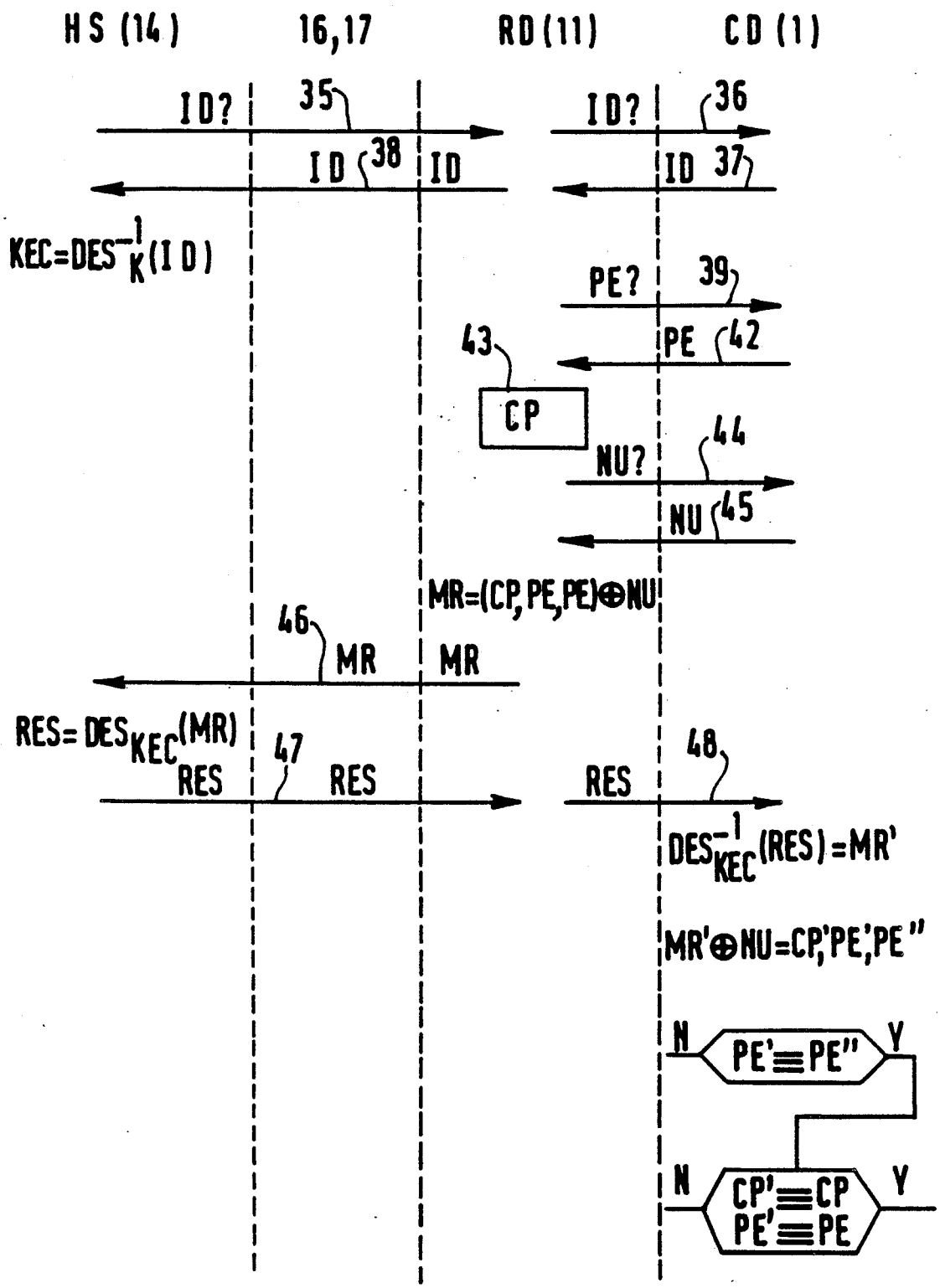
FIG. 3 shows the diagram of a rehabilitation process for a blocked card by a competent host system in accordance with the invention.

The remote rehabilitation principle which is shown in FIG. 3 in the form of diagrammatic exchanges between four parties, being the same as in FIG. 2, i.e. HS, RD, CD and the bearer of the card, consists in the resetting to an active state of a card which has been blocked following three consecutive false or incorrect presentations of the confidential bearer code CP. Such blocking occurs upon what is presumed to be a case of use of the card by a non-authorized person or the result of several incorrect attempts by the bearer himself. By way of example it is assumed hereinafter that the memory 7 inter alia comprises a known control zone which comprises several virgin bit lines (bits all in state 1) in which a write action is done each time when the bearer code CP of the card is presented. A correct presentation of CP is translated into a fused bit (irreversible passage from the state 1 to the state 0), from left to right in the line and from the top downwards of the lines. The bit fused is indicated by a pointer, the latter stepping by one bit position upon such correct presentation. For simplicity, the example shows only one single line of bits. Moreover, a false or erroneous presentation of the code translates into a non-fused bit. This is effected in such way, that the pointer steps by two bit positions if the most recent presentation was correct. If the most recent presentation was incorrect as well, the pointer steps by one position only. Further, the bit indicated after the stepping is always fused. The solution adopted in case only one or two errors occur consecutively, is that the pattern ..100.. may be fused to ..000.. provided that the next -1-bit is fused upon occurrence of a correct presentation of the code. Now, the following table shows a sequence of memory states in a practical example, wherein the position of the pointer is shown by underlining of the bit position in question.

| | |
|---|---|
| 1 error | 00...01011...11 |
| 2 errors | 00...01001...11 |
| 1 correct presentation | 00...00001...11 |
| 1 error | 00...0000010111 |
| 2 errors | 00...0000010011 |
| 3 errors (blocking) | 00...0000010001 |

The program in the memory 6 is conceived to recognize the "false" configuration 1000 in this zone and to block the card as a result. The address of the B in the state 1 designated as error parameter PE, marks the bit B by way of its line number and its rank in the line, the address PE being saved in the memory RAM 10. In the application shown in FIG. 3, the card CD is connected to a remote host system HS by way of the reader RD. This connection is obligatory because the host system possesses the master key KEC necessary for rehabilitating the card, i.e. for unblocking the card, obtainable by the authorized fusion of the bit B. Preferably, as in the application in FIG. 2, the key KEC is not transmitted in the open and the first exchanges take place substantially as in said first application. The exchanges are the following:

At 35, the host system HS dispatches an instruction to the reader RD in order to read the identification code ID, said instruction being relayed (at 36) from the reader to the card CD. The code ID is transmitted from CD to RD at 37 and subsequently, at 38, from RD to HS. The host system calculates the key KEC in the form of a cryptogram:

$$KEC = DES_K^{-1}(ID)$$

where K is a master key and KEC is a key which is derived from the master key and which is contained in the card and considered to be the master key for the relevant application. At 39, RD dispatches an error parameter request instruction PE to the card. CD transmits PE to RD at 42. The arrow 44 indicates a request instruction for the (pseudo random) unique number NU from RD to CD, which number NU is calculated by the card, stored in the memory RAM and also applied to RD (at 45). The reader RD invites the bearer to present (or introduce) his bearer code at 43 and performs, by bit-wise modulo-2 addition, the calculation of a rehabilitation message MR:

$$MR = (CP, PE, PE) \oplus NU$$

Herein, the entity PE is inserted twice for enhanced security. Now, subsequently, RD dispatches the message MR (arrow 46) to the host system HS, accompanied by an instruction requesting the authentication of this message. HS encrypts MR by means of the key KEC:

$$RES = DES_{KEC}(MR)$$

and applies, at 47, the resultant cryptogram RES to RD, which itself transmits it to CD (at 48). Finally, the card successively performs three calculations. The first calculation is the inverse encryption, using the key KEC, of the cryptogram RES:

$$DES_{KEC}^{-1}(RES) = MR'$$

after which the cryptogram resultant MR' is combined with NU by modulo-2 addition:

$$MR' \oplus + NU = CP', PE', PE''.$$

Herein the resultant PE' PE" derive from the two respective instances of PE initially introduced into the message MR.

This calculation utilizes the modulo-2 addition property that it produces a result in the form of a first operand after the latter has been modulo-2 added twice in succession to a second operand. The third and last calculation consists in the execution of the comparison between PE', PE" and PE on the one hand and the verification that the resultant CP is indeed indentical to the bearer code CP stored in the card on the other hand:

$$CP' = CP$$

$$PE' = PE''$$

$$PE' = PE.$$

In the case where the three identities exist (Y, Y), the bit B at the address PE is fused and the card is thus rehabilitated. However, if at least one of the identities does not exist (N,N), the bit B remains 1 and the card remains blocked.

Number formatting problems may arise for the described calculations. For example, the DES algorithm requires 64-bit keys; consequently, the data to be encrypted must have a length of 64 bits. If the data to be encrypted has a length of less than 64 bits, it must be supplemented with "0" or "1" in order to obtain 64 bits.

When the card has decrypted the message RES in the second application by performing:

$$DES_{KEC}^{-1}(RES) = MR'$$

and has subsequently combined the resultant cryptogram MR' with NU by modulo-2 addition, there is obtained:

$$CP', PE', PE''.$$

If the card verifies a redundancy on PE', i.e. PE' = PE", it will thus be ensured that the host system is indeed authentic because it possessed the correct key for encrypting the message. Thus, the redundancy enables the verification of the authenticity of the transmitter in this case.

I claim:

1. A method of validating access to a smart card via a reader, said card having within it a processor, and being configured with a production key PK and a distributor key MK readable by said processor, said method comprising generating by said processor of a pseudo-random unique number NU by executing the following steps:

modulo-2 adding the keys PK and MK to obtain a key KMP: KMP = PK ⊕ MK;

generating a unique input message ME which is modified on each specific use; and generating said number NU by encrypting said input message ME by means of a reversible encryption algorithm ALG utilizing the key KMP: NU = $ALG_{KMP}(ME)$; then:

reading by said reader of the generated number NU; and determining by said processor whether a response applied to the card by the reader has been correctly calculated in accordance with a predetermined function of the generated number NU.

2. A method as claimed in claim 1, wherein said reversible encryption algorithm is in accordance with the standard known as: Data Encryption Standard (DES).

3. A method as claimed in claim 1, wherein said card also is configured with a bearer code CP readable by said processor, for comparison with a bearer code CP presented by a bearer, and a serial number NS readable by said processor, said card also having first and second counters for containing counts CTRAM and CTROM, respectively, said generating said input message ME being by juxtaposing said serial number NS and said counts CTRAM and CTROM, said counts CTRAM and CTROM of said first and second counters resulting from the following steps:

upon a setting or resetting of said card to an active state, initializing the count CTRAM of said first counter to zero;

upon each generation of the number NU, incrementing the count CTRAM of said first counter; and incrementing the count CTROM of said second counter upon a specific use after each setting or resetting of the card to an active state if the bearer code CP presented by the bearer does not correspond to the bearer code CP with which said card is configured or if the first counter overflows.

4. A method as claimed in claim 3, wherein said reversible encryption algorithm is in accordance with the standard known as: Data Encryption Standard (DES).

5. A method as claimed in claim 1, wherein said generating of said unique number NU is in response to application by the reader of an instruction for the smart card to generate the unique number NU, and said response applied by the reader is of an authentication value VAE obtained in accordance with said predetermined function by encrypting said number NU by means of said encryption algorithm ALG, utilizing a master key KAC:

$$VAE = ALG_{KAC}(NU).$$

6. A method as claimed in claim 5, wherein said reversible encryption algorithm is in accordance with the standard known as: Data Encryption Standard (DES).

7. A method as claimed in claim 5, wherein said card also is configured with a bearer code CP readable by said processor, for comparison with a bearer code CP presented by a bearer, and a serial number NS readable by said processor, said card also having first and second counters for containing counts CTRAM and CTROM, respectively, said generating said input message ME being by juxtaposing said serial number NS and said counts CTRAM and CTROM, said counts CTRAM and CTROM of said first and second counters resulting from the following steps:

upon a setting or resetting of said card to an active state, initializing the count CTRAM of said first counter to zero;

upon each generation of the number NU, incrementing the count CTRAM of said first counter; and incrementing the count CTROM of said second counter upon a specific use after each setting or resetting of the card to an active state if the bearer code CP presented by the bearer does not correspond to the bearer code CP with which said card is configured or if the first counter overflows.

8. A method as claimed in claim 1 wherein said card also is configured with a bearer code CP readable by said processor, for comparison with a bearer code CP presented to the reader by a bearer, said access to the card is for rehabilitating it by enabling cancellation of an error parameter PE stored in the card after a predetermined standard length series of consecutive flase presentations of said bearer code CP, said generating of said unique number NU is in response to application by the reader of an instruction for the smart card to generate the unique number NU, said method further comprising the following steps:

reading by the reader of the error parameter PE from the card;

seizing by the reader of a bearer code CP presented by the bearer;

calculating by the reader of a rehabilitation message MR by juxtaposing said presented bearer code CP and two instances of said error parameter PE and by modulo-2 addition:

$$MR = (CP, PE, PE) \oplus NU;$$

dispatching by the reader of the rehabilitation message MR to a host system coupled to the reader, accompanied by an instruction requesting authentication of the message MR, in accordance with said predetermined function, encrypting by the host system of the message MR by way of the encryption algorithm ALG utilizing a master key KEC to form the cryptogram RES: $RES = ALG_{KEC}(MR)$; and dispatching by the host system of the cryptogram RES to the reader;

wherein said response is the cryptogram RES, and in response to said determining, cancelling the error parameter PE.

9. A method as claimed in claim 8, wherein said reversible encryption algorithm is in accordance with the standard known as: Data Encryption Standard (DES).

10. A method as claimed in claim 8, wherein said card also is configured with a bearer code CP readable by said processor, for comparison with a bearer code CP presented by a bearer, and a serial number NS readable by said processor, said card also having first and second counters for containing counts CTRAM and CTROM, respectively, said generating said input message ME being by juxtaposing said serial number NS and said counts CTRAM and CTROM, said counts CTRAM and CTROM of said first and second counters resulting from the following steps:

upon a setting or resetting of said card to an active state, initializing the count CTRAM of said first counter to zero;

upon each generation of the number NU, first incrementing the count CTRAM of said first counter; and second incrementing the count CTROM of said second counter upon a specific use after each setting or resetting of the card to an active state if the bearer code CP presented by the bearer does not correspond to the bearer code CP with which said card is configured or if the first counter overflows.

11. A generator for generating a pseudo-random unique number NU for individualizing a particular access via a reader to a smart card housing said generator, said generator comprising:

storage means for storing a production key PK, a distributor key MK, a serial number NS, and a bearer code CP, for comparison with a bearer code CP presented by a bearer;

first and second counters for containing respective counts CTRAM and CTROM;

input message generating means responsive to said storage means and said first and second counters for therefrom juxtaposing said serial number NS and said counts CTRAM and CTROM to generate an input message ME;

key generating means fed by said storage means for modulo-2 adding said production key PK and said distributor key MK to form a key KAC;

encryption means responsive to said input message generating means and said key generating means for forming said number NU by encrypting said input message ME utilizing said key KAC;

reset means for resetting said first counter to upon a setting or resetting of said card to an active state;

first incrementing means for, upon each generation of the number NU, incrementing the count CTRAM of said first counter; and second incrementing means for incrementing the count CTROM of said second counter upon a specific use after each setting or resetting of the card to an active state if the bearer code CP presented by the bearer does not correspond to the bearer code CP with which said card is configured or if the first counter overflows.

12. A system for validating access to a smart card via a reader, comprising within said card:

storage means for storing a production key PK, a distributor key MK, a serial number NS, and a bearer code CP, for comparison with a bearer code CP presented by a bearer;

a counter for containing a count CTRAM;

input message generating means responsive to said storage means and said counter for therefrom juxtaposing said serial number NS and said count CTRAM to generate an input message ME;

key generating means fed by said storage means for modulo-2 adding said production key PK and said distributor key MK to form a key KAC;

encryption means responsive to said input message generating means and said key generating means for forming a pseudo-random unique number NU by encrypting said input message ME utilizing said key KAC; and incrementing means for, upon each formation of the number NU, incrementing the count CTRAM of said counter;

means for enabling said reader to read the unique number NU formed; and means for determining whether a response applied to the card by the reader has been correctly calculated in accordance with a predetermined function of the unique number NU.

13. A system as claimed in claim 12, wherein said system further comprises a host system coupled to the card via a reader, wherein said reader comprises:

means for generating an instruction for the card to generate the unique number NU; and means for generating, as said response, an authentication value VAE obtained in accordance with said predetermined function by encrypting said number NU by means of said encryption alogorithm ALG, utilizing a master key KAC:

$$VAE = ALG_{KAC}(NU).$$

14. A system as claimed in claim 12 wherein said access to the smart card is for rehabilitating it by enabling cancellation of an error parameter PE stored in said storage means of the card after a predetermined standard length series of consecutive false presentations of said bearer code CP, said system further comprising said reader and a host system coupled to the reader, wherein said reader comprises:

means for generating and applying to the card an instruction for the card to generate the unique number NU;

means for reading the error parameter PE from the card;

means for seizing a bearer code CP presented by the bearer;

means for calculating a rehabilitation message MR by juxtaposing said presented bearer code CP and two instances of said error parameter PE and by modulo-2 addition:

$$MR = (CP, PE, PE) \oplus NU;$$

means for dispatching the calculated rehabilitation message MR to said host system, accompanied by an instruction requesting authentication of the message MR; and means for applying to said card as said response a cryptogram RES received from host system in response to the calculated rehabilitation message MR, when authenticated;

wherein said host system comprises:

means for, in accordance with said predetermined function, encrypting the message MR by way of the encryption algorithm ALG utilizing a master key KEC to form the cryptogram RES: RES = $ALG_{KEC}(MR)$; and means for dispatching the cryptogram RES to the reader; and wherein said card further comprises means for cancelling the error parameter PE, in response to a determination by said determining means that said response was correctly calculated.

* * * * *